(12) United States Patent
Kim et al.

(10) Patent No.: US 9,056,935 B2
(45) Date of Patent: Jun. 16, 2015

(54) PHOTOCURABLE RESIN COMPOSITION, METHOD OF FABRICATING OPTICAL FILM USING THE SAME, AND OPTICAL FILM INCLUDING THE SAME

(75) Inventors: Hyoun Young Kim, Uiwang-si (KR); Sang Cheon Park, Uiwang-si (KR); Keun Young Kim, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 106 days.

(21) Appl. No.: 13/339,843

(22) Filed: Dec. 29, 2011

(65) Prior Publication Data

US 2012/0172480 A1 Jul. 5, 2012

(30) Foreign Application Priority Data

Dec. 31, 2010 (KR) .................. 10-2010-0140777

(51) Int. Cl.
| | | |
|---|---|---|
| *C08L 33/14* | (2006.01) | |
| *C08F 222/20* | (2006.01) | |
| *C08F 230/02* | (2006.01) | |
| *C09J 4/06* | (2006.01) | |
| *C08F 222/22* | (2006.01) | |

(52) U.S. Cl.
CPC ............ *C08F 222/20* (2013.01); *C08F 222/22* (2013.01); *C08F 230/02* (2013.01); *C09J 4/06* (2013.01)

(58) Field of Classification Search
CPC ............ C08L 33/00; C09D 4/00; G02B 1/10; G02B 1/12; C08F 2/48; C08F 4/6097; C08F 4/6094; C08F 222/20; C08F 222/22; C08F 230/02; C09J 4/06
USPC .................................... 522/77, 109; 264/1.36
See application file for complete search history.

(56) References Cited

U.S. PATENT DOCUMENTS

| | | | | |
|---|---|---|---|---|
| 5,445,871 | A | * 8/1995 | Murase et al. | ................. 428/215 |
| 2004/0248038 | A1 | 12/2004 | Yokoyama et al. | |
| 2005/0244752 | A1 | * 11/2005 | Yoshizawa et al. | ...... 430/270.12 |
| 2006/0189706 | A1 | * 8/2006 | Tokuda et al. | ................. 522/109 |

FOREIGN PATENT DOCUMENTS

| | | |
|---|---|---|
| CN | 1826540 A | 8/2006 |
| JP | 2003-137938 A | 5/2003 |
| KR | 10 2008-0061703 A | 7/2008 |
| KR | 10 2010-0069988 A | 6/2010 |

OTHER PUBLICATIONS

"Sartomer" (Refractive Index and Product Selection), p. 1-9.*
Sartomer SR9036 product detail; Arkema, Inc., 2014.*
Korean Office Action in KR 10-2010-0140777, dated Jul. 22, 2013 (Kim, et al.).
Chinese Office Action in CN 201110438870.3, dated Oct. 10, 2013, with English translation (Kim, et al.).
Office Action mailed Jan. 2, 2014 in corresponding Taiwanese Patent Application No. 100148167.
Office Action mailed Aug. 29, 2014 in corresponding Taiwanese Patent Application No. 100148167.

* cited by examiner

*Primary Examiner* — Michael Pepitone
(74) *Attorney, Agent, or Firm* — Lee & Morse, P.C.

(57) ABSTRACT

A photocurable resin composition includes an ester (meth) acrylate, an antistatic agent, a silicone additive, an initiator, and at least one UV-curable unsaturated compound. The at least one UV-curable unsaturated compound may include a monofunctional or multifunctional UV-curable monomer, and a (meth)acrylate containing about 10 mol % or more of an ethylene oxide group.

8 Claims, No Drawings

PHOTOCURABLE RESIN COMPOSITION, METHOD OF FABRICATING OPTICAL FILM USING THE SAME, AND OPTICAL FILM INCLUDING THE SAME

BACKGROUND

1. Field

Embodiments relate to a photocurable resin composition, a method of fabricating an optical film using the same, and an optical film including the same.

2. Description of the Related Art

Performance of an image display unit of a liquid crystal display (LCD) is substantially influenced by performance of a backlight unit including an optical film, since the LCD generally adjusts intensity of light by reflecting or transmitting light through the optical film.

SUMMARY

An embodiment is directed to a photocurable resin composition, including an ester (meth)acrylate, an antistatic agent, a silicone additive, an initiator, and at least one UV-curable unsaturated compound. The at least one UV-curable unsaturated compound may include a monofunctional or multifunctional UV-curable monomer, and a (meth)acrylate containing about 10 mol % or more of an ethylene oxide group.

The (meth)acrylate containing about 10 mol % or more of an ethylene oxide group may include about 10 to about 50 mol % of the ethylene oxide group.

The (meth)acrylate containing about 10 mol % or more of an ethylene oxide group may have a refractive index of about 1.35 to about 1.55.

The at least one UV-curable unsaturated compound may include about 50 to about 80 wt % of the (meth)acrylate containing about 10 mol % or more of an ethylene oxide group.

The (meth)acrylate containing about 10 mol % or more of an ethylene oxide group may be a compound having a structure represented by Formula 1:

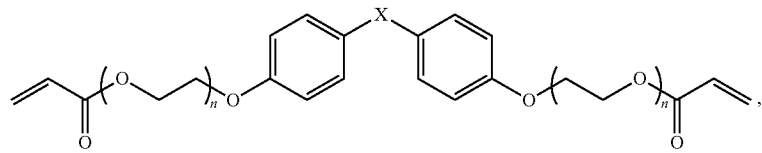

wherein X represents a C1 to C10 linear or branched alkylene group, oxygen, or sulfur, and n independently represents an integer from 5 to 50.

The monofunctional or multifunctional UV-curable monomer may be present in an amount of about 20 to about 200 parts by weight based on 100 parts by weight of the (meth)acrylate containing about 10 mol % or more of an ethylene oxide group.

The monofunctional or multifunctional UV-curable monomer may include one or more of phenoxybenzyl (meth)acrylate, bisphenol F (meth)acrylate, novolac epoxy (meth)acrylate, phenyl phenoxyethyl (meth)acrylate, bisphenol A epoxy (meth)acrylate, ethoxylated thiodiphenyl di(meth)acrylate, fluorene (meth)acrylate, or phenylthioethyl (meth)acrylate.

The at least one UV-curable unsaturated compound may further include a phosphagen acrylate represented by Formula 2:

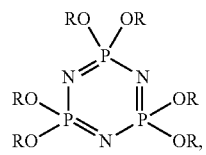

where R is represented by Formula 3:

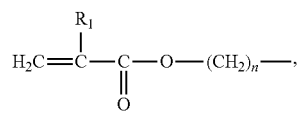

where R1 represents hydrogen, a C1 to C10 linear or branched alkyl group, or a C6 to C30 aryl, aryl alkyl, or alkyl aryl group, and n represents an integer from 1 to 5.

The at least one UV-curable unsaturated compound may include about 30 to about 45 wt % of the (meth)acrylate containing 10 mol % or more of an ethylene oxide group, about 30 to about 60 wt % of the monofunctional or multifunctional UV-curable monomer, and about 10 to about 25 wt % of the phosphagen acrylate.

The ester (meth)acrylate may be present in an amount of about 0.1 to about 5 parts by weight based on 100 parts by weight of the at least one UV-curable unsaturated compound.

Another embodiment is directed to a method of fabricating an optical film, the method including applying a photocurable resin composition according to an embodiment to a mold engraving roll that is engraved with a prism layer pattern, curing the photocurable resin composition while the photocurable resin composition applied to the mold engraving roll is in contact with one side of a base film, and separating a coating layer of the photocurable resin composition cured and bonded to the base film from the mold engraving roll.

Another embodiment is directed to an optical film including a cured product of a photocurable resin composition according to an embodiment.

DETAILED DESCRIPTION

Korean Patent Application No. 10-2010-0140777, filed on Dec. 31, 2010, in the Korean Intellectual Property Office, and entitled: "Photocurable Resin Composition, Method of Fabricating Optical Film Using the Same, and Optical Film Including the Same," is incorporated by reference herein in its entirety.

Example embodiments will now be described more fully hereinafter; however, they may be embodied in different forms and should not be construed as limited to the embodiments set forth herein. Rather, these embodiments are provided so that this disclosure will be thorough and complete, and will fully convey the scope of the invention to those skilled in the art.

In an example embodiment, a photocurable resin composition includes at least one UV-curable unsaturated compound, an ester (meth)acrylate, an antistatic agent, a silicone additive, and an initiator.

UV-Curable Unsaturated Compound

The photocurable resin composition may include a (meth)acrylate containing 10 mol % or more of an ethylene oxide group as the UV-curable unsaturated compound.

The resin composition may be used for forming an optical film such as a prism film. The (meth)acrylate containing 10 mol % or more of an ethylene oxide group may substantially improve elasticity of a prism layer (prepared from the composition) after curing, thereby providing strong restoring properties and excellent scratch resistance. This may help minimize a defect rate in assembly of a backlight unit. In an implementation, the UV-curable unsaturated compound may be, or may include, a (meth)acrylate containing about 10 to about 50 mol % or more of an ethylene oxide group, preferably about 10 to about 35 mol % of an ethylene oxide group.

The (meth)acrylate containing 10 mol % or more of the ethylene oxide group may have a refractive index of about 1.35 to about 1.55. For example, the (meth)acrylate containing 10 mol % or more of an ethylene oxide group may have a refractive index of about 1.48 to about 1.55.

The (meth)acrylate containing 10 mol % or more of an ethylene oxide group may have a structure represented by Formula 1:

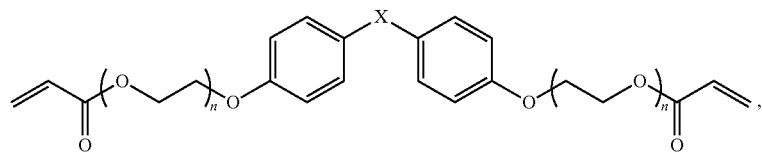

wherein X represents a C1 to C10 linear or branched alkylene group, oxygen, or sulfur, and n independently represents an integer from 5 to 50.

In an implementation, X may be —C(CH$_3$)$_2$—, —CH$_2$—, or —S—, and n may independently represent an integer from 10 to 40.

In addition to the (meth)acrylate containing 10 mol % or more of an ethylene oxide group, the UV-curable unsaturated compound may further include a phosphagen acrylate. The phosphagen acrylate may provide the prism layer with increased hardness and improve scratch resistance after the composition is cured, which may help minimize a defect rate in assembly of a backlight unit.

The phosphagen acrylate may have a refractive index of about 1.45 to about 1.55. For example, the phosphagen acrylate may have a refractive index of about 1.50.

The phosphagen acrylate may be a cyclic phosphagen, e.g., a cyclotriphosphazine. The phosphagen acrylate may have a structure represented by Formula 2:

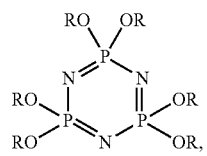

wherein R is represented by Formula 3:

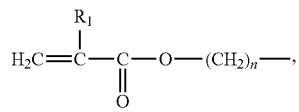

wherein R1 represents hydrogen, a C1 to C10 linear or branched alkyl group, or a C6 to C30 aryl, aryl alkyl, or alkyl aryl group, and n represents an integer from 1 to 5.

For example, R1 may represent hydrogen or a methyl group, and n may represent 2. In an implementation, the phosphagen acrylate may be phosphagen methacrylate.

In addition to the methacrylate containing 10 mol % or more of an ethylene oxide group and the phosphagen acrylate, the UV-curable unsaturated compound may further include a monofunctional or multifunctional UV-curable monomer.

The monofunctional or multifunctional UV-curable monomer may help improve release properties of a final UV-curable highly refractive resin from a mold (e.g., a soft mold or a metal mold coated with nickel) of an engraving roll during processing of the final UV-curable highly refractive resin. Also, the monofunctional or multifunctional UV-curable monomer may help increase adhesion to a base film at room temperature or at high-temperature/high humidity conditions after curing, and may enhance the surface hardness of prisms in an optical sheet.

The multifunctional UV-curable monomer may be bifunctional or more, preferably bifunctional to tetrafunctional.

The monofunctional or multifunctional UV-curable monomer may include at least one monomer selected from generally known (meth)acrylate monomers, without being particularly limited thereto. For example, the monofunctional or multifunctional UV-curable monomer may include one or more of 1,6-hexanediol mono(meth)acrylate, 2-hydroxyethyl (meth)acrylate, 2-hydroxypropyl (meth)acrylate, 2-hydroxybutyl (meth)acrylate, 2-hydroxy-3-phenyloxypropyl (meth)acrylate, 1,4-butanediol (meth)acrylate, 2-hydroxyalkyl (meth)acryloyl phosphate, 4-hydroxycyclohexyl (meth)acrylate, neopentylglycol mono(meth)acrylate, trimethylolethane di(meth)acrylate, trimethylolpropane di(meth)acrylate, pentaerythritol tri(meth)acrylate, dipentaerythritol penta(meth)acrylate, pentaerythritol hexa(meth)acrylate, dipentaerythritol hexa(meth)acrylate, glycerol di(meth)acrylate, tetrahydrofurfuryl (meth)acrylate, isodecyl (meth)acrylate, 2-(2-ethoxyethoxy)ethyl (meth)acrylate, stearyl (meth)acrylate, lauryl (meth)acrylate, 2-phenoxyethyl (meth)acrylate, isobornyl (meth)acrylate, tridecyl (meth)acrylate, ethoxylated nonylphenol (meth)acrylate, ethyleneglycol di(meth)acrylate, diethyleneglycol di(meth)acrylate, triethyleneglycol di(meth)acrylate, tetra-ethyleneglycol di(meth)acrylate, polyethyleneglycol di(meth)acrylate, 1,3-butyleneglycol di(meth)acrylate, tripropyleneglycol di(meth)acrylate, ethoxylated bisphenol A di(meth)acrylate, cyclohexanedimethanol di(meth)acrylate, phenoxy-tetra-glycol (meth)acrylate, 2-methacryloyloxyethyl phosphate, dimethylol tricyclodecane di(meth)acrylate, trimethylol-propanebenzoate (meth)acrylate, fluorene (meth)acrylate, phenoxybenzyl (meth)acrylate, bisphenol F (meth)acrylate, bisphenol A epoxy (meth)acrylate, novolac epoxy (meth)acrylate, phenyl phenoxyethyl (meth)acrylate, ethoxylated thiodiphenyl di(meth)acrylate, phenylthioethyl (meth)acrylate, etc.

For example, the monofunctional or multifunctional UV-curable monomer may include one or more of phenoxybenzyl (meth)acrylate, bisphenol F (meth)acrylate, novolac epoxy (meth)acrylate, phenyl phenoxyethyl (meth)acrylate, bisphenol A epoxy (meth)acrylate, ethoxylated thiodiphenyl di(meth)acrylate, fluorene (meth)acrylate, or phenylthioethyl (meth)acrylate.

The monofunctional or multifunctional UV-curable monomer may be present in an amount of about 20 to about 200 parts by weight, based on 100 parts by weight of the (meth)acrylate containing 10 mol % or more of an ethylene oxide group. Within this range, good wettability to a base film may be exhibited without reducing adhesion. Further, cracks may be less likely to occur after the prism film is manufactured because flexibility of the main chain of the polymer may be maintained. In an implementation, the monofunctional or multifunctional UV-curable monomer may be present in an amount of about 30 to about 160 parts by weight, based on 100 parts by weight of the (meth)acrylate containing 10 mol % or more of an ethylene oxide group.

The UV-curable unsaturated compound may be present in an amount of about 75 to about 99 wt % in terms of solid content in the photocurable resin composition. Within this range, a matrix after curing may stably form a crosslinked network structure. In an implementation, the amount may be about 85 to about 99 wt %.

In an embodiment, the UV-curable unsaturated compound may include the (meth)acrylate containing 10 mol % or more of an ethylene oxide group and the monofunctional or multifunctional UV-curable monomer. Here, based on 100 parts by weight of the UV-curable unsaturated compound, the (meth)acrylate containing 10 mol % or more of an ethylene oxide group may be present in an amount of about 50 to about 80 wt % and the monofunctional or multifunctional UV-curable monomer may be present in an amount of about 20 to about 50 wt %.

In another embodiment, the UV-curable unsaturated compound may include the (meth)acrylate containing 10 mol % or more of an ethylene oxide group, the monofunctional or multifunctional UV-curable monomer, and the phosphagen acrylate. Here, based on 100 parts by weight of the UV-curable unsaturated compound, the (meth)acrylate containing 10 mol % or more of an ethylene oxide group may be present in an amount of about 30 to about 45 wt %, the monofunctional or multifunctional UV-curable monomer may be present in an amount of about 30 to about 60 wt %, and the phosphagen acrylate may be present in an amount of about 10 to about 25 wt %.

Ester (Meth)Acrylate

The ester (meth)acrylate may help improve adhesion of the photocurable resin composition to a base film after curing.

The ester (meth)acrylate may be, or may include, e.g., a polyester (meth)acrylate. The ester (meth)acrylate may be synthesized by a general ester condensation reaction or be obtained from commercially available products. For example, one or more of ECX4114, ECX5031, ECX6025, or PHOTOMER 4846 (all available from COGNIS) may be used.

The ester (meth)acrylate may be present in an amount of about 0.1 to about 5 parts by weight, based on 100 parts by weight of the UV-curable unsaturated compound. Within this range, adhesion to a substrate may be improved without reducing the refractive index of a prism film after curing. In an implementation, the amount of the ester (meth)acrylate may be about 0.1 to about 2 parts by weight.

The ester (meth)acrylate may be present in an amount of 0.39 to about 2 wt % in terms of solid content in the photocurable resin composition. For example, the amount may be about 0.5 to about 1.5 wt %.

Antistatic Agent

The antistatic agent may help prevent a buildup of static electricity during manufacture or assembly of a prism film. The antistatic agent may include, e.g., a compound obtained by combination of a reactive silicone resin having ethylene oxide or propylene oxide with an ion-conductive polymer ionically combined with an ion-conductive metal.

The antistatic agent may be a resin in which a reactive silicone chain represented by Formula 4 is combined with an ion-conductive polymer:

[Formula 4]

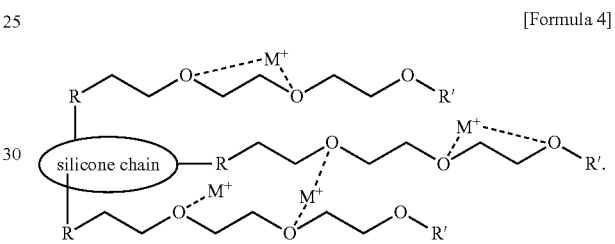

In Formula 4, a repeat unit of a reactive silicone chain and an ethylene oxide chain is not particularly limited, R may be —CH$_2$— or O, R' may be —CH$_3$ or —CH=CH$_2$, and M may be an alkali metal.

In an implementation, M may be lithium.

The antistatic agent may be prepared by combination of a general reactive silicone resin with an ion-conductive polymer in which ethylene oxide or propylene oxide is ionically combined with an ion-conductive metal, or may be obtained from commercially available products. For example, one or more of the following may be used: HR-E, ELECON-600DA, ELECON-700DA, IL-A21-9, IL-A2, or IL-A5. Of these, HR-E, ELECON-600DA, and ELECON-700DA are all available from Nano Chem Tech, and Ionic Liquid Series IL-A21-9, IL-A2, and IL-A5 are all available from KOEI.

The antistatic agent may be present in an amount of about 0.1 to about 10 wt % in terms of solid content in the photocurable resin composition. Within this range, an antistatic effect may be exhibited and ionic components may not substantially float on the surface in high-temperature/high-humidity environments, which may help avoid deterioration in interfacial adhesion and mechanical and optical properties of prisms. In an implementation, the amount of the antistatic agent may be about 0.1 to about 5 wt % in terms of solid content in the photocurable resin composition.

Silicone Additive

The silicone additive may help enhance release properties of the photocurable resin composition from a metal mold.

The silicone additive may generally include, e.g., a polyether siloxane copolymer or organic modified polysiloxanes. Commercially available versions of the silicone additive may include BYK UV-3500, BYK UV-3530 (all available from BYK), TEGO Glide-100, TEGO Glide-ZG400, and TEGO Glide-450 (all available from TEGO).

The silicone additive may be present in an amount of about 0.01 to about 8 wt % in terms of solid content in the photocurable resin composition. Within this range, release properties from a metal mold may be improved, and interfacial adhesive properties and mechanical and optical properties of prisms may be prevented from deteriorating in high-temperature/high-humidity environments. In an implementation, the amount of the silicone additive may be about 0.01 to about 2 wt % in terms of solid content in the photocurable resin composition.

Initiator

The initiator is used for UV curing of the photocurable resin composition. The initiator may include one or more of a photoinitiator and a radical initiator. For example, one or more of propanone, ketone, phosphine oxide, or phosphate initiators may be used.

The initiator may be present in an amount of about 0.5 to about 7 wt % in terms of solid content in the photocurable resin composition. Within this range, due to high photoreactivity, the mechanical strength of prisms may not decrease and optical properties of a prism layer may not deteriorate, such that yellowing of the prism layer is reduced or eliminated. In an implementation, the amount of the initiator may be about 1 to about 6 wt % in terms of solid content in the photocurable resin composition.

In another example embodiment, a method of fabricating an optical film includes using the photocurable resin composition. In detail, the method may include applying the photocurable resin composition according to an embodiment to a mold engraving roll that is engraved with a prism layer pattern. The method may further include curing the photocurable resin composition when the photocurable resin composition applied to the mold engraving roll is in contact with a base film at one side thereof, and producing an optical film by separating a coating layer of the photocurable resin composition cured and bonded to the base film from the mold engraving roll.

The photocurable resin composition may be applied to the mold engraving roll engraved with the prism layer pattern by a general coating method.

The base film may be a transparent material, for example, glass, a transparent synthetic resin, etc. In an implementation, the base film may be a polyethylene terephthalate (PET) material.

The photocurable resin composition may be cured by, e.g., irradiation of UV rays with a wavelength of about 190 to about 450 nm at about 100 to about 900 mJ/cm$^2$.

The prism layer of the optical film may have a height of about 30 to about 50 μm.

In another example embodiment, an optical film according to an embodiment may be manufactured by the method described above. In an example embodiment, the optical film includes a cured product of the photocurable resin composition described above.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect. A description of details apparent to those skilled in the art will may be omitted herein.

Details of components used in Examples and Comparative Examples are described as follows:

1) UV-curable unsaturated compound

M3190 available from Miwon Commercial Co., Ltd. was used as (A1) an acrylate containing 9 mol % of ethylene oxide group.

M2100 available from Miwon Commercial Co., Ltd. was used as (A2) an acrylate containing 10 mol % of ethylene oxide group.

TBP102 available from HanNong Chemicals Inc. was used as (A3) an acrylate containing 10 mol % of ethylene oxide group.

M3150 available from Miwon Commercial Co., Ltd. was used as (A4) an acrylate containing 15 mol % of ethylene oxide group.

M2300 available from Miwon Commercial Co., Ltd. was used as (A5) an acrylate containing 30 mol % of ethylene oxide group BP302 available from HanNong Chemicals Inc. was used as (A6) an acrylate containing 30 mol % of ethylene oxide group.

BP322 available from HanNong Chemicals Inc. was used as (A7) an acrylate containing 32 mol % of ethylene oxide group.

PPZ available from Idemitsu was used as (B) a phosphagen acrylate.

(C1) Fluorene acrylate, (C2) phenoxybenzyl acrylate, (C3) bisphenol F acrylate, (C4) novolac epoxy acrylate, (C5) phenyl phenoxyethyl acrylate, (C6) bisphenol A epoxy acrylate, and (C7) ethoxylated thiodiphenyl diacrylate were used as monofunctional or multifunctional UV-curable monomers.

2) ECX 5031 available from COGNIS was used as an ester acrylate.

3) HR-E, silicone modified ion-conductive acrylate, available from Nano Chem Tech, was used as an antistatic agent.

4) UV-3530, polyether modified acrylic functional group-added polydimethylsiloxane, available from BYK, was used as a silicone additive.

5) Irgacure 184 and Irgacure TPO, 1-hydroxy-cyclohexyl-phenyl-ketone, available from Ciba, were used as an initiator.

Examples 1 to 6

Preparation of Photocurable Resin Composition

Photocurable resin compositions were prepared by mixing the components according to compositions listed in Table 1.

TABLE 1

|  |  | Ex. 1 | Ex. 2 | Ex. 3 | Ex. 4 | Ex. 5 | Ex. 6 |
| --- | --- | --- | --- | --- | --- | --- | --- |
| UV-curable unsaturated compound | A1 | — | — | — | — | — | — |
|  | A2 | 50 | — | — | — | — | — |
|  | A3 | — | 70 | — | — | — | — |
|  | A4 | — | — | — | 40 | — | — |
|  | A5 | — | — | — | — | 35 | — |
|  | A6 | — | — | — | — | — | 30 |
|  | A7 | — | — | 50 | — | — | — |
|  | B | — | — | — | 16 | 20 | 15 |
|  | C1 | 22 | — | 22 | — | — | 32 |
|  | C2 | 10 | 5 | 10 | — | — | 15 |
|  | C3 | 10 | 7 | 10 | — | — | — |
|  | C4 | — | — | — | 26 | 27 | — |
|  | C5 | — | — | — | 10 | — | — |
|  | C6 | — | — | — | — | 10 | — |
|  | C7 | — | 10 | — | — | — | — |

TABLE 1-continued

|                    | Ex. 1 | Ex. 2 | Ex. 3 | Ex. 4 | Ex. 5 | Ex. 6 |
|--------------------|-------|-------|-------|-------|-------|-------|
| Ester acrylate     | 1     | 1     | 1     | 1     | 1     | 1     |
| Antistatic agent   | 2     | 2     | 2     | 2     | 2     | 2     |
| Silicone additive  | 1     | 1     | 1     | 1     | 1     | 1     |
| Initiator          | 4     | 4     | 4     | 4     | 4     | 4     |

(all amounts in parts by weight)

Comparative Example 1

Preparation of Photocurable Resin Composition

A photocurable resin composition was prepared in the same manner as in the Examples, except that (A1) acrylate containing 9 mol % of ethylene oxide was used instead of the (A2) acrylate containing 10 mol % of ethylene oxide as used in Example 1.

Comparative Example 2

Preparation of Photocurable Resin Composition

A photocurable resin composition was prepared in the same manner as in the Examples, except that high-hardness urethane acrylate (Miramer PU370, Miwon Commercial Co., Ltd.) was used instead of the (A2) acrylate containing 10 mol % of ethylene oxide used in Example 1.

Experiment: Evaluation of Properties of Prism Film Formed of Photocurable Resin Composition Each of the photocurable resin compositions produced in the Examples and Comparative Examples was applied to a soft mold or metal mold engraved with a prism layer pattern. While a base film was in contact with a coating layer of the composition on the engraving mold at one side, the applied composition was photo-cured by irradiation of UV light. The coating layer bonded to the base film and cured was separated from the engraving mold, thereby producing a prism film with the prism layer formed on one side of the base film. Here, the prism layer was formed to a height of 30 μm and UV light with a wavelength of 190 nm was used and irradiated at 500 mJ/cm$^2$ in an electrodeless UV irradiation apparatus (600 W/inch) equipped with a D-type bulb.

Each photocurable resin composition and each prism film was evaluated in terms of the following properties, and the results are shown in Table 2.

<Evaluation Method>

1. Refractive Index

A refractometer (Model No.: 1T, ATAGO ABBE, Japan) was used to measure the refractive index of each photocurable resin composition. For measurement, a D-line sodium lamp with a wavelength of 589.3 nm was used as a light source.

2. Brightness (Cd/m$^2$)

Each prism film was secured to a backlight unit for a 17-inch LCD panel, followed by measuring brightness at 25 spots and 9 spots on the LCD panel using a brightness photometer (Model No.: BM-7, TOPCON, Japan) to calculate an average value.

3. Scratch Resistance (g)

Each composition was applied to a transparent PET base film and cured, and then the cured prism layer was turned over to contact an anti-glass side. A balance weight up to 500 g was placed thereon and moved back and forth 10 times within a distance of 10 cm, followed by measurement of the weight of the balance weight at which prisms started being damaged.

4. Yellowing (ΔYI)

Each prism film was left in a Weather-O-meter at 50° C. and 0.34 W/m$^2$ for 200 hours, followed by measurement of the degree of discoloring using a color-difference meter.

5. Adhesion (Number of Remaining Matrices/100)

Each photocurable resin composition was applied to a transparent PET base film and cured, and only the cured prism layer was then cut into 100 matrix structures with an area of 10 mm$^2$. Then, a tape was bonded thereto and strongly released in the vertical direction, followed by counting up separated matrices.

6. Surface Resistance (Ω/cm$^2$)

Each composition was applied a transparent PET base film and cured, followed by measurement of surface resistance while applying voltage using a DSM-8103, Toa Co., Japan.

7. Release Properties

Each photocurable resin composition was placed between a metal mold engraved with a prism shape and a polyester base film to form a laminate, after which processibility, such as a releasing sound when the base film was released from the metal mold, was indicated as a grade from 0 to 10. Here, 10 was defined as excellent release properties.

TABLE 2

|  | Refractive index | Brightness (Cd/m$^2$) | Scratch resistance (g) | Yellowing (ΔYI) | Adhesion (Number of remaining matrices/100) | Surface resistance (Ω/cm$^2$) | Release properties |
|---|---|---|---|---|---|---|---|
| Example 1 | 1.555 | 3538 | 350 | 7.0 | 100 | $1.0 \times 10^{11}$ | 10 |
| Example 2 | 1.551 | 3532 | 450 | 6.5 | 100 | $5.5 \times 10^{10}$ | 10 |
| Example 3 | 1.545 | 3510 | 450 | 6.6 | 100 | $2.5 \times 10^{10}$ | 10 |
| Example 4 | 1.564 | 3621 | 380 | 7.5 | 100 | $3.0 \times 10^{11}$ | 10 |
| Example 5 | 1.565 | 3625 | 350 | 6.1 | 100 | $1.5 \times 10^{10}$ | 10 |
| Example 6 | 1.571 | 3648 | 400 | 6.0 | 100 | $3.0 \times 10^{11}$ | 10 |
| Comp. Example 1 | 1.525 | 3385 | 150 | 8.5 | 90 | $9.1 \times 10^{12}$ | 8 |
| Comp. Example 2 | 1.530 | 3410 | 100 | 8.7 | 95 | $4.3 \times 10^{12}$ | 9 |

As shown Table 2, the prism films formed of the photocurable resin compositions according to Examples 1 to 6 had high scratch resistance, improved brightness and refractive index, and enhanced adhesion to a base film. Further, these prism films had proper viscosity for a process, thus exhibiting good release properties. In addition, the prism films included the antistatic agent and thus had an antistatic effect.

By way of summation and review, a prism sheet may be used as a film to improve the brightness of an LCD. The LCD may not emit light by itself, and thus it may use a light source (CCFL or LED) to generate light, may distribute the light to the entire display area through a light guide plate, and may change the light into surface light having uniform brightness using a diffuser sheet. In this process, the amount of light from the light source may be gradually decreased. Thus, a prism sheet may be used to change side light into front light and to collect reflected light, thereby improving brightness.

A prism sheet used as a light collecting sheet may be implemented as an optical sheet having thin-film flexibility and in which prisms are arranged, e.g., linearly arranged, on one side to form a structured surface so as to improve brightness. In addition to such the physical structure, particular optical materials may be used to improve brightness. For example, a material may be used based on its refractive index, which may be an important optical factor to improve brightness. The prism performance may be proportional to the refractive index thereof. For improving brightness of a prism sheet, optical properties (including the refractive index of a film and the refractive indices of photo-cured materials forming prisms) may be important factors.

A prism sheet may suffer from breakage of prism shapes due to contraction rates of a film and a coating agent, due to an external force caused by negligence of workers upon transfer of the prism sheet after manufacture, or during a process of assembling a backlight unit. Typical photocurable monomers and compositions applied to a prism sheet may not prevent such breakage and therefore a prism sheet using a photocurable composition having self-restoring properties has been considered. A urethane acrylate having a low refractive index and good elasticity may be used to provide self-restoration, but it may not provide an improvement in brightness.

As described above, embodiments relate to a photocurable resin composition, a method of fabricating an optical film using the same, and an optical film including the same. According to an embodiment, a photocurable resin composition includes a (meth)acrylate containing 10 mol % or more of an ethylene oxide group.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A photocurable resin composition for an optical film, comprising:
    (a) a UV-curable unsaturated compound including a (meth)acrylate containing about 10 mol % to about 50 mol % of an ethylene oxide group;
    (b) a monofunctional or multifunctional monomer and a phosphagen acrylate;
    (c) an ester (meth)acrylate;
    (d) an antistatic agent;
    (e) a silicone additive; and
    (f) an initiator, wherein:
    the monofunctional or multifunctional monomer includes one or more of phenoxybenzyl (meth)acrylate, bisphenol F (meth)acrylate, novolac epoxy (meth)acrylate, phenyl phenoxyethyl (meth)acrylate, bisphenol A epoxy (meth)acrylate, ethoxylated thiodiphenyl di(meth)acrylate, fluorene (meth)acrylate or phenylthioethyl (meth)acrylate,
    the phosphagen acrylate is represented by Formula 2:

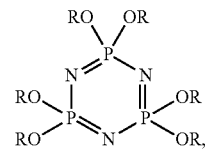

where R is represented by Formula 3:

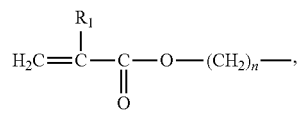

where R1 represents hydrogen, a C1 to C10 linear or branched alkyl group, or a C6 to C30 aryl, aryl alkyl, or alkyl aryl group, and n represents an integer from 1 to 5, and
    (a) and (b) combined include:
        about 30 to about 45 wt % of the (meth)acrylate containing the ethylene oxide group,
        about 30 to about 60 wt % of the monofunctional or multifunctional monomer, and
        about 10 to about 25 wt % of the phosphagen acrylate.

2. The photocurable resin composition as claimed in claim 1, wherein the (meth)acrylate containing the ethylene oxide group has a refractive index of about 1.35 to about 1.55.

3. The photocurable resin composition as claimed in claim 1, wherein (a) includes a compound having a structure represented by Formula 1:

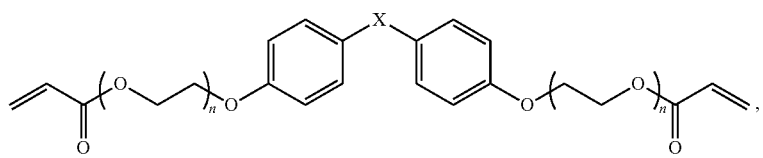

wherein X represents a C1 to C10 linear or branched alkylene group, oxygen, or sulfur, and n independently represents an integer from 5 to 50.

4. The photocurable resin composition as claimed in claim 1, wherein:
(b) is present in an amount of about 20 to about 200 parts by weight based on 100 parts by weight of (a).

5. The photocurable resin composition as claimed in claim 1, wherein (c) is present in an amount of about 0.1 to about 5 parts by weight based on 100 parts by weight of (a).

6. A method of fabricating an optical film, the method comprising:
applying the photocurable resin composition as claimed in claim 1 to a mold engraving roll that is engraved with a prism layer pattern;
curing the photocurable resin composition while the photocurable resin composition applied to the mold engraving roll is in contact with one side of a base film; and
separating a coating layer of the photocurable resin composition cured and bonded to the base film from the mold engraving roll.

7. An optical film comprising a cured product of the photocurable resin composition as claimed in claim 1.

8. The photocurable resin composition as claimed in claim 1, wherein the (meth)acrylate containing the ethylene oxide group contains about 30 mol % to about 50 mol % of the ethylene oxide group.

* * * * *